(12) United States Patent
Challberg et al.

(10) Patent No.: US 6,934,350 B1
(45) Date of Patent: Aug. 23, 2005

(54) CORE CONFIGURATION FOR A NUCLEAR REACTOR

(75) Inventors: Roy C. Challberg, Livermore, CA (US); Larry E. Fennern, San Jose, CA (US); Russell M. Fawcett, Naperville, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/597,113

(22) Filed: Jun. 20, 2000

Related U.S. Application Data

(63) Continuation-in-part of application No. 09/024,867, filed on Feb. 17, 1998, now Pat. No. 6,097,779.

(51) Int. Cl.[7] ............................................. G21C 5/00
(52) U.S. Cl. ...................... 376/353; 376/219; 376/362; 376/434; 376/438; 376/448
(58) Field of Search ................................ 376/353, 362, 376/434, 448, 219, 438

(56) References Cited

U.S. PATENT DOCUMENTS

| | | | |
|---|---|---|---|
| 3,194,743 A | * 7/1965 | Deddens et al. | ............ 376/219 |
| 3,878,042 A | 4/1975 | Curulla et al. | |
| 4,348,355 A | 9/1982 | Nylund | ...................... 376/434 |
| 4,544,522 A | 10/1985 | Curulla et al. | .............. 376/441 |
| 4,585,614 A | 4/1986 | Helmersson | ................. 376/434 |
| 4,615,862 A | 10/1986 | Huckestein | .................. 376/362 |
| 4,649,021 A | * 3/1987 | Taleyarkhan | ................. 376/444 |
| 6,205,196 B1 | * 3/2001 | Yamashita et al. | .......... 376/438 |

FOREIGN PATENT DOCUMENTS

| | | | |
|---|---|---|---|
| JP | 04-122889 | * | 4/1992 |
| JP | 04-296693 | * | 10/1992 |
| JP | 04-301596 | * | 10/1992 |
| JP | 06-138275 | * | 5/1994 |
| JP | 06-174874 | * | 6/1994 |
| JP | 10-274468 | * | 10/1998 |

OTHER PUBLICATIONS

Nuclear Engineering International, Nov., 1987, pp. 42–44, Werner Brettschuh and Heiner Siegert, "Reducing outage times at German BWRS".

* cited by examiner

*Primary Examiner*—Jack Keith
(74) *Attorney, Agent, or Firm*—Armstrong Teasdale LLP

(57) ABSTRACT

In an embodiment of the present invention, the core of a nuclear reactor includes a plurality of fuel cells and a plurality of large control rods. Each large control rod is about two times the width of a conventional control rod and includes four control rod blades extending radially from a central portion and arranged at right angles to each other. The blades define four fuel bundle receiving channels. The core is configured so that the control rods are-arranged in a plurality of staggered rows with four fuel bundles in each receiving channel.

10 Claims, 4 Drawing Sheets

CORE CONFIGURATION FOR A NUCLEAR REACTOR

CROSS REFERENCE TO RELATED APPLICATIONS

This application is a continuation-in-part of U.S. patent application Ser. No. 09/024,867 filed Feb. 17, 1998, now U.S. Pat. No. 6,097,779.

BACKGROUND OF THE INVENTION

This invention relates generally to nuclear reactors and, more particularly, to fuel bundle and control rod configurations for nuclear reactors.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds the both the core plate and the top guide. The top guide includes several openings, and fuel bundles are inserted through the openings and are supported by the core plate.

A plurality of openings are formed in the bottom head dome so that components, such as control rod drive assemblies, can extend within the RPV. As an is example, for a control rod drive assembly, a control rod drive housing, for example, a tube, is inserted through the bottom head dome opening and a control rod drive is inserted through the control rod drive housing. The control rod drive is coupled to a control rod to position the control rod within the core.

A nuclear reactor core includes individual fuel assemblies that have different characteristics that affect the strategy for operation of the core. For example, a nuclear reactor core has many, e.g., several hundred, individual fuel bundles that have different characteristics. Such bundles preferably are arranged within the reactor core so that the interaction between the fuel bundles satisfies all regulatory and reactor design constraints, including governmental and customer specified constraints. In addition to satisfying the design constraints, since the core loading arrangement determines the cycle energy, i.e., the amount of energy that the reactor core generates before the core needs to be refreshed with new fuel elements, the core loading arrangement preferably optimizes the core cycle energy.

In order to furnish the required energy output, the reactor core is periodically refueled with fresh fuel bundles. To optimize core cycle energy, the higher reactivity bundles may be positioned at an inner core location. To satisfy some design constraints, however, higher reactivity bundles generally are positioned at an outer core location. The most depleted fuel bundles, i.e., the bundles with the least remaining energy content, are removed from the reactor. The interval between refuelings is referred to as a cycle of operation.

During the course of the cycle of operation, the excess reactivity, which defines the energy capability of the core, is controlled in two ways. Specifically, a burnable poison, e.g., gadolinia, is incorporated in the fresh fuel. The quantity of initial burnable poison is determined by design constraints typically set by the utility and by the NRC. The burnable poison controls most, but not all, of the excess reactivity.

Control rods also control the excess reactivity. Specifically, the reactor core contains control rods which assure safe shutdown and provide the primary mechanism for controlling the maximum power peaking factor. The total number of control rods available varies with core size and geometry, and is typically between 50 and 269. The position of the control rods, i.e., fully inserted, fully withdrawn, or somewhere between, is based on the need to control the excess reactivity and to meet other operational constraints, such as the maximum core power peaking factor.

One known control rod includes a central portion having four radially extending blades. The blades define four fuel bundle channels, and when inserting the control rod into the core, the control rod is positioned so that one fuel bundle is positioned within each channel. Therefore, for example, approximately 100 control rods are included in a reactor having 400 fuel bundles.

To reduce the number of control rods necessary for efficient operation, one known reactor includes fuel bundles arranged in a K-lattice configuration. Each fuel bundle in such reactor is substantially larger than a conventional size fuel bundle, and represents twice the pitch as the conventional BWR fuel configuration. The larger fuel bundles facilitate increasing the peaking factor of the BWR core. Particularly, the maximum channel integrated power, i.e., highest radial peaking factor, is greater for such large twice pitch K-lattice fuel bundle core than for a core loaded with conventional size fuel bundles. The maximum channel peaking factor for the large twice pitch bundle core, for example, is approximately 1.7, whereas the maximum channel peaking factor for a conventional core typically is approximately about 1.4 or 1.5.

Such larger fuel bundles also facilitate reducing the number of control rod drives, and thus reduce the capital cost of the reactor. Particularly, fuel assemblies including such twice pitch bundles are approximately four times the size of conventional fuel assemblies. Accordingly, fewer twice pitch bundles may be installed in nuclear reactor as compared to standard size fuel bundles. Fewer control rods, therefore, are needed to control reactivity between the fewer twice pitch bundles as compared to standard size fuel bundles. Power is generated with fewer twice pitch fuel bundles as compared to standard size fuel bundles. In addition, refueling time is decreased due to the reduced number of fuel bundles.

The twice pitch bundles provide for a nuclear reactor having a reduced number of control rod drives and a substantial reduction in capital cost as compared with a conventional reactor utilizing conventional fuel bundles. However, such larger bundles typically also require substantial redesign of the fuel assembly, (e.g., with a twice pitch bundle design, the fuel assembly is approximately four times the size of a conventional fuel assembly). Similarly, the larger bundles typically impose more parasitic material in the core, and are more susceptible to bow and bulge. In addition, the ability to perform sub-bundle shuffling, i.e., the ability to reposition individual fuel. bundles within the core or remove individual fuel bundles from the core, is substantially compromised with the larger fuel bundles.

It would be desirable to reduce the number of control rod drives without requiring substantial redesign of a fuel assembly. It also would be desirable to reduce the number of control rod drives without substantially compromising the ability to perform sub-bundle shuffling.

BRIEF SUMMARY OF THE INVENTION

In an embodiment of the present invention, the core of a nuclear reactor includes a plurality of fuel bundles and a plurality of large control rods. Each large control rod is about two times the width of a conventional control rod and includes four control rod blades extending radially from a central portion and arranged at right angles to each other. The blades define four fuel bundle receiving channels. The core is configured so that the control rods are arranged in a plurality of staggered rows with four fuel bundles in each receiving channel. This configuration is defined as an F-lattice configuration.

In this F-lattice configuration a fuel cell is formed by one large control rod and sixteen fuel bundles. The four blades of the control rod divide the fuel cell into four equal quadrants. The fuel bundles are arranged around the control rod so that there are four fuel bundles in each quadrant of the fuel cell. The core is formed from a plurality of fuel cells. In the F-lattice configuration with the large control rods arranged in staggered rows, each edge of a fuel cell is adjacent to and substantially parallel to a blade of a control rod.

The F-lattice configuration results in a reduction of the number of control rods needed for the control of a core. For example, when 269 control rods are used in a nuclear reactor core design, the F-lattice configuration can reduce the number of control rods to 137. This results in a cost reduction because of the reduction in the number of control rod drives needed in the reactor.

The F-lattice configuration also permits the use of standard sized fuel bundles without the need to redesign the fuel bundle assemblies. Additionally, the staggered row configuration of the large control rods increases the relative poison worth of the large control rods.

DETAILED DESCRIPTION OF THE INVENTION

Figure 1:
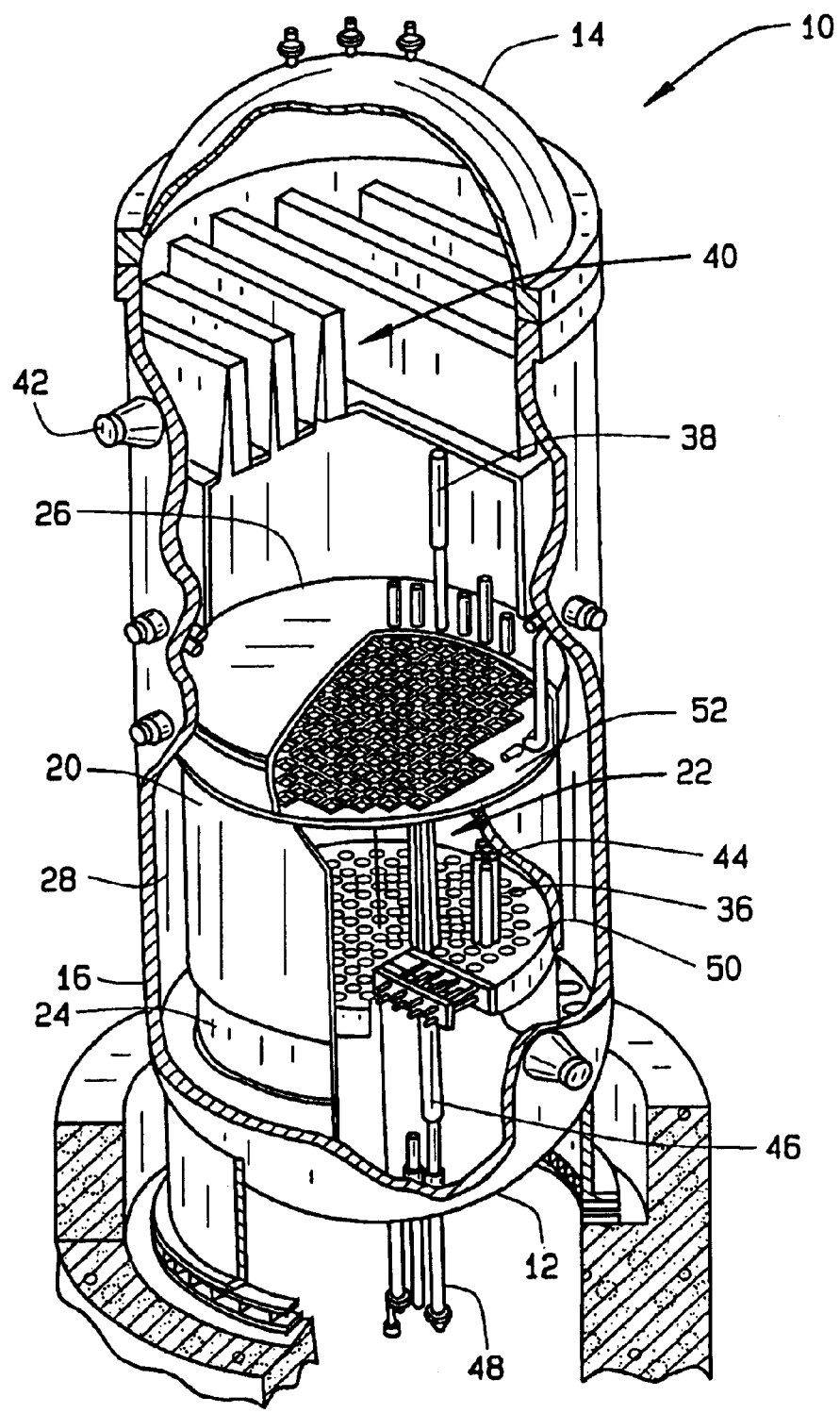
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16.

Heat is generated within core 22, which includes fuel bundles 36 of fissionable material. Water circulated up through core 22 is at least partially converted to steam. Steam separators 38 separates steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rod 44 is inserted into fuel bundle 36, it absorbs neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12.

Fuel bundles 36 are aligned by a core plate 50 located at the base of core 22. A top guide 52 aligns fuel bundles 36 as they are lowered into core 22. Core plate 50 and top guide 52 are supported by core shroud 20. Fuel bundles 36 have a substantially square cross section. In alternative embodiments, fuel bundles can have a rectangular or other polygon cross section.

Figure 2:
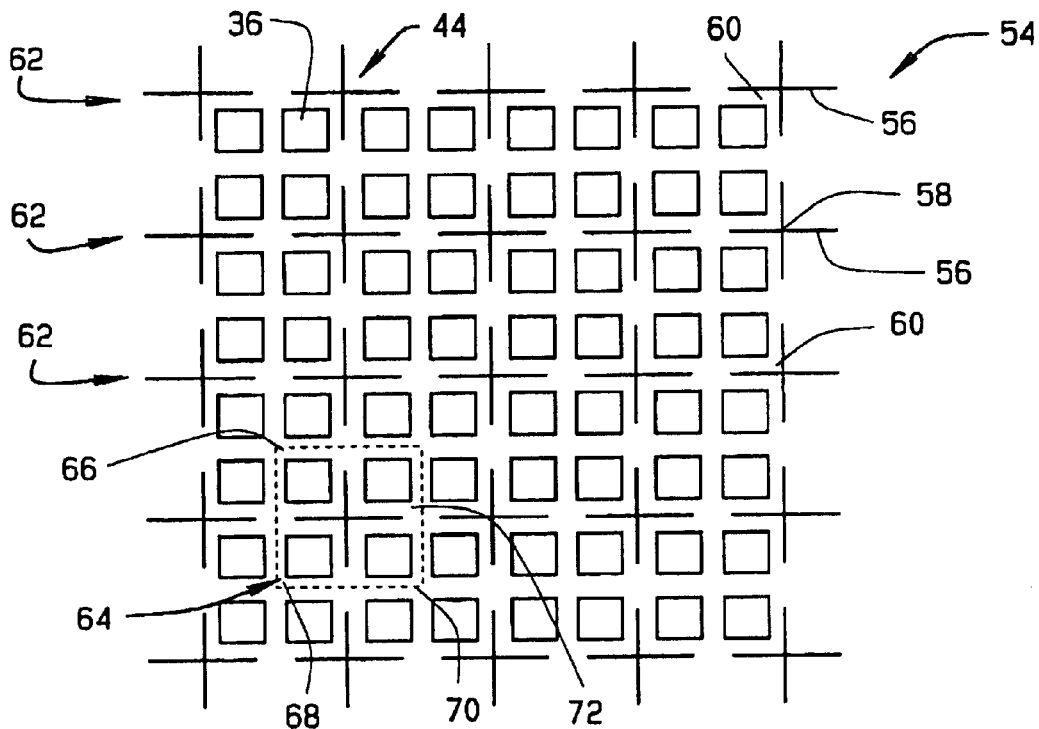
FIG. 2 is schematic top view of a core configuration for the nuclear reactor shown in FIG. 1.

FIG. 2 is schematic top view of a conventional configuration 54 of control rods 44 and fuel bundles 36 of core 22 in nuclear reactor 10. Control rods 44 include four control rod blades 56 extending radially from a central portion 58 and arranged at right angles to each other. Blades 56 define four fuel bundle receiving channels 60 around control rod 44. Each receiving channel 60 is sized to receive one fuel bundle 36. Conventional configuration 54 has control rods 44 arranged in even rows 62 between fuel bundles 36. This arrangement is known as a square pitch. Arrangement 54 includes four fuel bundles 36 surrounding each control rod 44 with each fuel bundle 36 positioned in a fuel bundle receiving channel 60.

A control rod 44 and four surrounding fuel bundles 36 define a fuel cell 64. Control rod blades 56 are positioned to divide cell 64 into four quadrants 66, 68, 70, and 72. Each quadrant 66, 68, 70, and 72 of cell 64 contains one fuel bundle 36.

Figure 3:
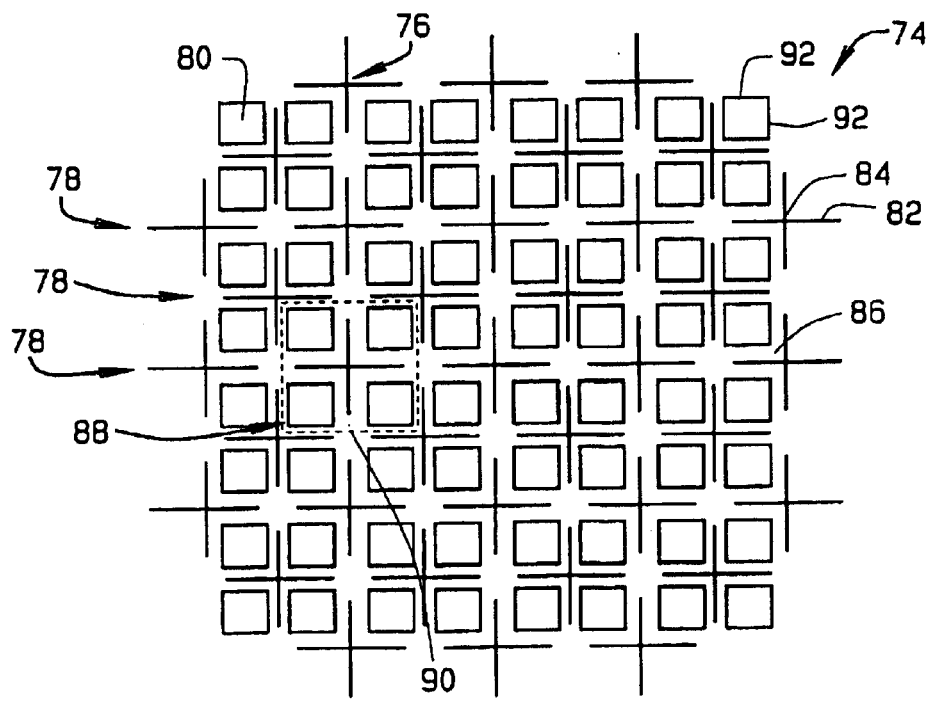
FIG. 3 is a schematic top view of another core configuration for athe nuclear reactor shown in FIG. 1.

FIG. 3 is a schematic top view of a K-lattice configuration 74 of core 22 in nuclear reactor 10. K-lattice configuration 74 has large control rods 76 in staggered rows 78 with four large fuel bundles 80 surrounding each large control rod 76. Large control rods 76 include four control rod blades 82 extending radially from a central portion 84 and arranged at right angles to each other. Blades 82 define four fuel bundle receiving channels 86 around control rod 76. Each large fuel bundle 80 is positioned in a fuel bundle receiving channel 86 so that each receiving channel 86 includes one large fuel bundle 80.

A large control rod 76 is between about 1.5 to 2.0 times the width of a conventional control rod 44 shown in FIG. 2. A large fuel bundle 80 is between 1.5 to 2.0 times the width of a conventional fuel bundle 36 shown in FIG. 2. Large control rods 76 and large fuel bundles 80 permit the use of fewer control rods in core 22.

In K-lattice configuration 74, a large control rod 76 and four surrounding large fuel bundles 80 define a fuel cell 88. Fuel cells 88 are similar to fuel cells 64 described above. However, because of the arrangement of large control rods 76 in staggered rows 78, a large control rod blade 82 is adjacent to and parallel 9 to each side 90 of cell 88. Particularly, in K-lattice configuration 74, a large control rod blade 82 is adjacent to and parallel to each side 92 of each large fuel bundle 80 in cell 88. As shown in FIG. 2, each fuel cell 64 does not have a control rod blade adjacent to and parallel to the sides of fuel cell 64.

As described above, maximum channel integrated power (i.e., highest radial peaking factor) is greater utilizing large fuel bundles 80 than for a core loaded with conventional size fuel bundles 36. While this increased pitch is desirable, large fuel bundles 80 substantially prevent performing sub-bundle shuffling, which often is desirable. Moreover, large fuel bundles 80 require larger bundle channels than standard size fuel bundles 36, and such larger bundle channels are expensive, add more parasitic material in the core region, and may have problems with bend and bow when irradiated.

Figure 4:
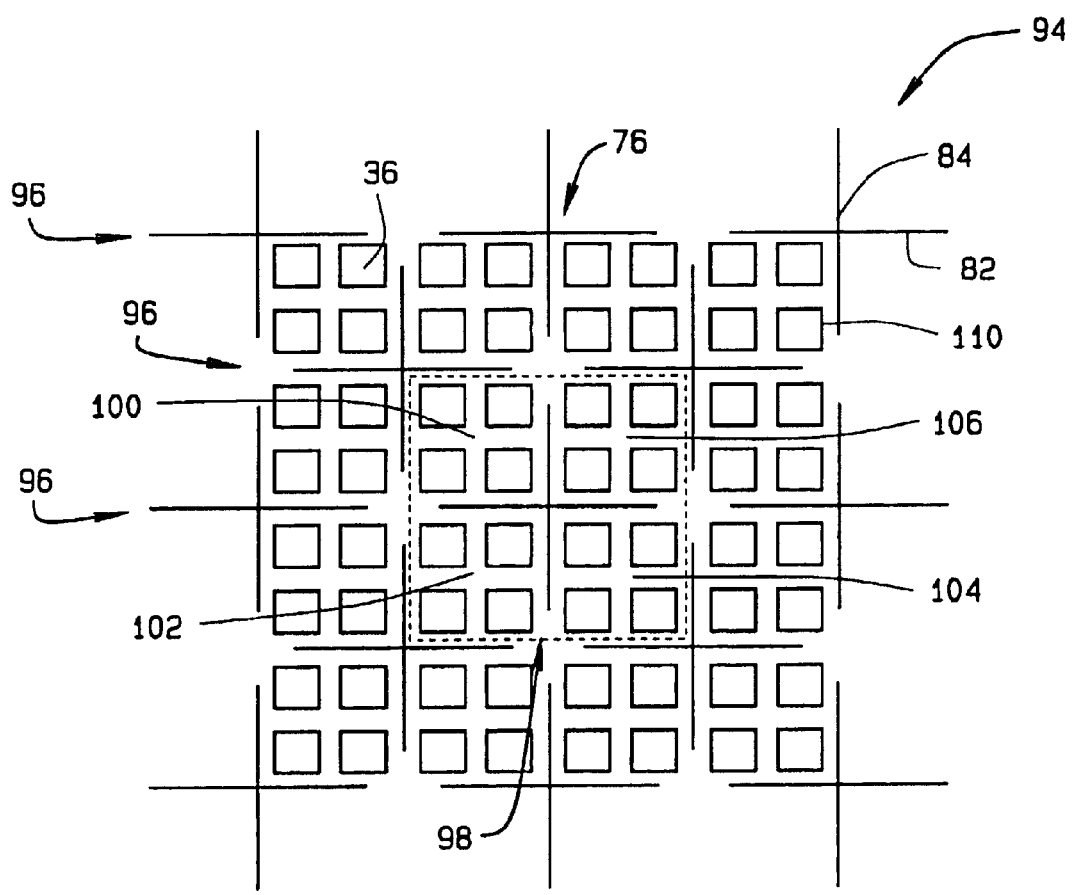
FIG. 4 is a schematic top view of a core configuration for the nuclear reactor shown in FIG. 1 in accordance with an embodiment of the present invention.

Referring to FIG. 4, in accordance with one embodiment of the present invention, and to obtain the benefits of reduced control rods and control rod drives, without suffering the problems associated with large fuel bundles 80 identified above, substantially standard size fuel bundles 36 and large control rods 76 are utilized in core 22. Particularly, nuclear reactor core 22 includes large control rods 76 and conventional size fuel bundles 36. Each large control rod 76 is sized to provide poison control for sixteen conventional size fuel bundles 36. Conventional size fuel assemblies 36 and large control rods 76 are arranged in a F-lattice configuration 94 to facilitate minimizing the number of control rod drives and control rods. F-lattice configuration 94 has large control rods 76 in staggered rows 96 with sixteen conventional fuel bundles 36 surrounding each large control rod 76.

Figure 5:
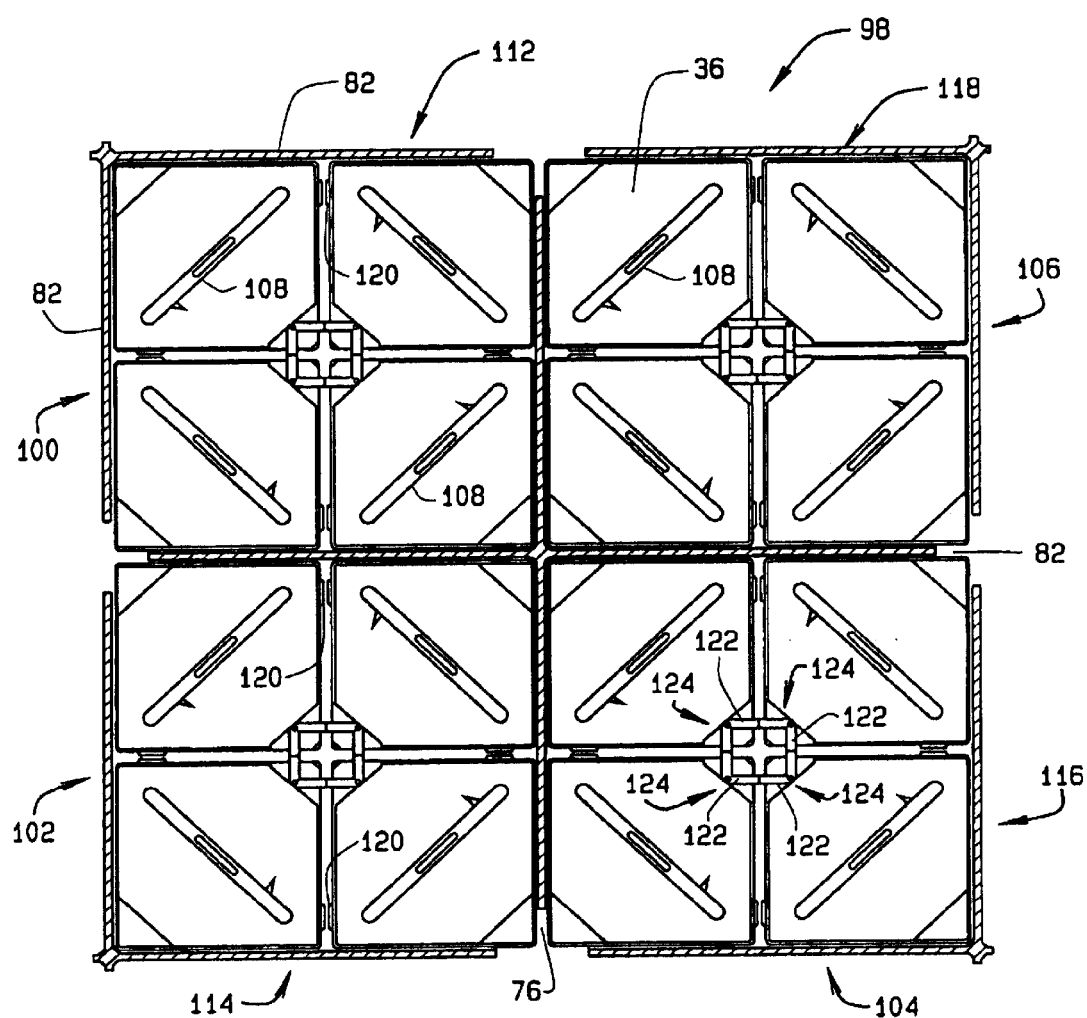
FIG. 5 is an enlarged schematic top view of a fuel cell shown in FIG. 4.

Referring also to FIG. 5, in F-lattice configuration 94, a large control rod 76 and sixteen surrounding conventional fuel bundles 36 define a fuel cell 98. Control rod blades 82 are positioned to divide cell 98 into four quadrants 100, 102, 104, and 106. Each quadrant 100, 102, 104, and 106 contains four conventional fuel bundles 36. Fuel cell 98 has a substantially square cross section. However, in other embodiments, fuel cell 98 can have a rectangular or other polygon shaped cross n section where the polygon has four to 12 sides. As described above, large control rod blades 82 define four fuel bundle receiving channels 86 around large control rod 76. Each receiving channel contains four fuel bundles 36. In alternative embodiments, F-lattice configuration can have fewer than, or more than four fuel bundles 36 in each fuel bundle receiving channel 86.

FIG. 5 is a schematic, more detailed, top view of one fuel cell 98 having sixteen standard size fuel bundles 36 surrounding one large control rod 76. Each fuel bundle 36 includes a handle 108 extending from its top end 110. Fuel bundles 36 are configured in four groups 112, 114, 116, and 118, and each group 112, 114, 116, and 118 includes a 2×2 matrix of fuel bundles 36. Each group 112, 114, 116, and 118 also is positioned within a respective fuel bundle receiving channel 86. Control rod blades 82 from adjacent large control rods 76 are located adjacent to and substantially parallel to the outer sides of cell 98. In this F-lattice arrangement 94, each receiving channel 86 is defined by two blades 82 from control rod 76 located within cell 98 and two blades 82 from an adjacent large control rod 76.

With respect to each group 112, 114, 116, and 118, channel spacers 120 are coupled to each fuel bundle 36 to substantially space each fuel bundle 36 from an adjacent fuel bundle 36. In addition, spring and guard assemblies 122 are coupled to fuel bundles 36 to facilitate supporting fuel bundles 36 within bundle receiving channels 86. For example, and referring only to group 112 of fuel bundles 36, four spring and guard assemblies 122 are substantially centered within group 112, and are coupled to adjacent corners 124 of fuel bundles 36, respectively.

F-lattice configuration 94 results in a reduction of the number of control rods needed for the control of core 22. For example, when 269 control rods are used in a nuclear reactor core design, F-lattice configuration 76 can reduce the number of control rods to 137. This results in a cost reduction because of the reduction in the number of control rod drives needed in the reactor.

F-lattice configuration 94 also permits the use of standard sized fuel bundles 36 without the need to redesign the fuel bundle assemblies. Additionally, staggered row configuration 78 of large control rods 76 increases the relative poison worth of large control rods 76.

While the invention has been described in terms of various specific embodiments, those skilled in the art will recognize that the invention can be practiced with modification within the spirit and scope of the claims.

What is claimed is:

1. A core for a nuclear reactor comprising:

a plurality of separate independent fuel assemblies wherein each said separate and independent fuel assembly is not a component of another fuel assembly, each said separate independent fuel assembly comprising a handle to facilitate lowering said fuel assembly into said core; and a plurality of large control rods, each said control rod comprising four control rod blades extending radially from a central portion and arranged at right angles to each other, said blades defining four fuel assembly receiving channels, said control rods arranged in a plurality of staggered rows with only four separate independent fuel assemblies in each said receiving channel and two sides of each of said four separate independent fuel assemblies adjacent a control rod blade.

2. A core in accordance with claim 1 wherein said large control rods and said plurality of fuel assemblies define a plurality of fuel cells, each said fuel cell comprising a large control rod and four fuel assemblies in each said receiving channel of said large control rod, said plurality of fuel cells arranged so that said control rods are in a staggered row pattern where each side of each said receiving channel of a fuel cell is adjacent to, and substantially parallel to a control rod blade.

3. A core in accordance with claim 1 further comprising a top guide having a plurality of top guide beams configured to define a plurality of openings.

4. A core in accordance with claim 3 further comprising a core plate spaced from said top guide, said fuel assemblies extending between said top guide and said core plate.

5. A core for a nuclear reactor comprising a plurality of fuel cells, each said fuel cell comprising;

a large control rod comprising four control rod blades extending radially from a central portion and arranged at right angles to each other, said blades defining four quadrants of said fuel cell, each said quadrant containing only four separate independent fuel assemblies wherein each said separate and independent fuel assembly is not a component of another fuel assembly, each said separate independent fuel assembly comprising a handle to facilitate lowering said fuel assembly into said core;

said plurality of fuel cells arranged so that said control rods are in a staggered row pattern where each side of each said quadrant of a fuel cell is adjacent to a control rod blade.

6. A core in accordance with claim 5 further comprising a top guide having a plurality of top guide beams configured to define a plurality of openings.

7. A core in accordance with claim 6 further comprising a core plate spaced from said top guide, said fuel assemblies extending between said top guide and said core plate.

8. A nuclear reactor core configuration, said core comprising a plurality of separate independent fuel assemblies, wherein each said separate and independent fuel assembly is not a component of another fuel assembly, and a plurality of large control rods, each said separate independent fuel assembly comprising a handle to facilitate lowering said fuel assembly into said core, each said control rod comprising four control rod blades extending radially from a central portion and arranged at right angles to each other, said blades defining four fuel assembly receiving channels, said configuration comprising:

said plurality of large control rods arranged in a staggered row pattern; and said fuel assemblies arranged with only four separate independent fuel assemblies in each said receiving and two sides of each of said four separate independent fuel assemblies adjacent a control rod blade.

9. A nuclear reactor core configuration in accordance with claim 8 wherein said core further comprises a top guide having a plurality of top guide beams configured to define a plurality of openings.

10. A nuclear reactor core configuration in accordance with claim 9 further comprising a core plate spaced from said top guide, said fuel assemblies extending between said top guide and said core plate.

* * * * *

UNITED STATES PATENT AND TRADEMARK OFFICE
CERTIFICATE OF CORRECTION

| | | |
|---|---|---|
| PATENT NO. | : 6,934,350 B1 | Page 1 of 1 |
| APPLICATION NO. | : 09/597113 | |
| DATED | : August 23, 2005 | |
| INVENTOR(S) | : Challberg et al. | |

It is certified that error appears in the above-identified patent and that said Letters Patent is hereby corrected as shown below:

In Claim 8, column 7, line 13, after "receiving" insert -- channel --.

Signed and Sealed this

Ninth Day of January, 2007

JON W. DUDAS
*Director of the United States Patent and Trademark Office*